United States Patent
Kuure et al.

(10) Patent No.: US 7,623,469 B2
(45) Date of Patent: *Nov. 24, 2009

(54) SERVICE PROVISION IN A COMMUNICATION SYSTEM

(75) Inventors: Pekka Kuure, Espoo (FI); Tapio Paavonen, Pirkkala (FI)

(73) Assignee: Nokia Corporation, Espoo (FI)

( * ) Notice: Subject to any disclaimer, the term of this patent is extended or adjusted under 35 U.S.C. 154(b) by 709 days.

This patent is subject to a terminal disclaimer.

(21) Appl. No.: 11/011,029

(22) Filed: Dec. 15, 2004

(65) Prior Publication Data

US 2006/0087982 A1    Apr. 27, 2006

(30) Foreign Application Priority Data

Oct. 25, 2004   (FI) ................................. 20041377

(51) Int. Cl.
*H04L 1/00* (2006.01)
(52) U.S. Cl. ..................................... 370/252
(58) Field of Classification Search ............... 370/252, 370/466; 455/466
See application file for complete search history.

(56) References Cited

U.S. PATENT DOCUMENTS

| | | | |
|---|---|---|---|
| 5,806,071 A * | 9/1998 | Balderrama et al. ........ | 707/104.1 |
| 6,115,393 A * | 9/2000 | Engel et al. ................. | 370/469 |
| 6,560,327 B1 * | 5/2003 | McConnell ................. | 379/229 |
| 6,574,326 B1 * | 6/2003 | Wong et al. ............. | 379/221.08 |
| 6,615,213 B1 * | 9/2003 | Johnson ...................... | 707/10 |
| 6,647,008 B1 * | 11/2003 | Galand et al. .............. | 370/389 |
| 6,970,935 B1 * | 11/2005 | Maes ......................... | 709/230 |
| 7,085,365 B2 * | 8/2006 | Kauppinen ............. | 379/202.01 |
| 7,219,154 B2 * | 5/2007 | Blakley et al. .............. | 709/229 |
| 7,330,452 B2 * | 2/2008 | Shiu et al. ................... | 370/335 |
| 7,346,019 B2 * | 3/2008 | Willey et al. ................. | 370/313 |
| 7,401,152 B2 * | 7/2008 | Traversat et al. ............. | 709/230 |
| 7,415,284 B2 * | 8/2008 | Hoover et al. ............... | 455/518 |

(Continued)

FOREIGN PATENT DOCUMENTS

WO   WO 2004/075581   9/2004

(Continued)

OTHER PUBLICATIONS

Data synchronization protocol in mobile computing environment using yncML Byung-Yun Lee; Tae-Wan Kim; Dae-Woong Kim; Hoon Choi: High Speed Networks and Multimedia Communications 5th IEEE International Conference on Jul. 3-5, 2002 pp. 133-137.*

(Continued)

*Primary Examiner*—Thong H Vu
(74) *Attorney, Agent, or Firm*—Ditthavong Mori & Steiner, P.C.

(57) ABSTRACT

A method enables obtaining parameters relating to a service provided in a communication system. The method comprises storing a first set of parameters relating to a service, the first set of parameters being valid when the service is controlled by a first network. The method further comprises determining whether a second set of parameters is needed, the second set of parameters relating to said service and being valid when said service is controlled by a second network. The method further comprises obtaining the second set of parameters, when needed. A communication device is configured to execute the method.

47 Claims, 5 Drawing Sheets

U.S. PATENT DOCUMENTS

| | | | |
|---|---|---|---|
| 2002/0019828 A1* | 2/2002 | Mortl ........................... | 707/200 |
| 2002/0107918 A1* | 8/2002 | Shaffer et al. ............... | 709/203 |
| 2002/0150091 A1 | 10/2002 | Lopponen et al. | |
| 2003/0149781 A1* | 8/2003 | Yared et al. ................. | 709/229 |
| 2004/0128201 A1* | 7/2004 | Ofir et al. ..................... | 705/17 |
| 2004/0148416 A1* | 7/2004 | Aarnos et al. ............... | 709/230 |
| 2004/0196826 A1 | 10/2004 | Bao et al. | |
| 2005/0039178 A1* | 2/2005 | Marolia et al. .............. | 717/168 |
| 2005/0041578 A1 | 2/2005 | Huotari et al. | |
| 2005/0220139 A1* | 10/2005 | Aholainen .................. | 370/466 |
| 2006/0014526 A1* | 1/2006 | Cherian ................... | 455/412.1 |
| 2007/0014263 A1* | 1/2007 | Ferrato et al. ............... | 370/335 |
| 2007/0218924 A1* | 9/2007 | Burman et al. .............. | 455/466 |

FOREIGN PATENT DOCUMENTS

| | | |
|---|---|---|
| WO | WO 2005/025255 | 3/2005 |
| WO | WO 2005/109940 | 11/2005 |

OTHER PUBLICATIONS

On the scalability of data synchronization protocols for PDAs and mobile devices Agarwal, S.; Starobinski, D.; Trachtenberg, A.; Network, IEEE vol. 16, Issue 4, Jul.-Aug. 2002 pp. 22-28.*

Provisioning Architecture Overview Version 1.1. Open Mobile Alliance, Ltd., Version: Nov. 12, 2002, pp. 1-20.

Provisioning Bootstrap Version 1.1. Open Mobile Alliance, Ltd., Version: Nov. 12, 2002, pp. 1-24.

Provisioning Content Version 1.1. Open Mobile Alliance, Ltd., Version: Nov. 12, 2002, pp. 1-39.

Provisioning Smart Card Specification Version 1.1. Open Mobile Alliance, Ltd., Version: Nov. 12, 2002, pp. 1-22.

Provisioning User Agent Behaviour Version 1.1. Open Mobile Alliance, Ltd., Version: Nov. 13, 2002, pp. 1-11.

* cited by examiner

SERVICE PROVISION IN A COMMUNICATION SYSTEM

FIELD OF THE INVENTION

The invention relates to communication systems, and services provided in communication systems. More particularly the invention relates to obtaining, providing and using the parameters relating to a service in a communication system.

BACKGROUND OF THE INVENTION

A communication system can be seen as a facility that enables communication sessions between two or more entities such as one or more communication devices and/or other nodes associated with the communication system. A communication system typically operates in accordance with a given standard or specification setting out what the various entities associated with the communication system are permitted to do and how that should be achieved. A standard or specification may define a specific set of rules, such as communication protocols and/or parameters, on which connections between the entities can be based.

Wireless communication systems include various cellular or otherwise mobile communication systems using radio frequencies for sending voice or data between stations, for example between a communication device and a transceiver network element. Examples of wireless communication systems may comprise public land mobile network (PLMN), such as global system for mobile communication (GSM), the general packet radio service (GPRS) and the universal mobile telecommunications system (UMTS). A mobile communication network may logically be divided into a radio access network (RAN) and a core network (CN). The core network entities typically include various control entities and gateways for enabling communication via a number of radio access networks and also for interfacing a single communication system with one or more communication systems, such as with other wireless systems, such as a wireless Internet Protocol (IP) network, and/or fixed line communication systems. Examples of radio access networks may comprise the UMTS terrestrial radio access network (UTRAN) and the GSM/EDGE radio access network (GERAN).

Subscribers, such as the users or end-users, to a communication system may be offered and provided numerous services, such as calls, data communication or multimedia services or simply an access to a network, such as the Internet. Servers may be used in provision of the services and may be operated by an operator of a network or by an external service provider. For example, the wireless application protocol (WAP) provides mobile communication devices services over wireless communication networks. For example, a mobile communication device may allow a user thereof to browse the Internet using the WAP.

Said services may comprise conferencing services, such as multiparty conferencing, for example so-called direct voice communication services. The direct voice communication service may allow users to engage in immediate communication with one or more users. One example of the direct voice communication services may comprise the "push-to-talk over cellular" (PoC) service also known as the PTT (push-to-talk service). The PoC may be based on Voice over IP (VoIP) technology in cellular networks, such as the GSM/GPRS network.

The direct voice communication services may use capabilities of, for example, the Internet Protocol Multimedia Subsystem (IMS) domain of the core network. The IMS enables IP connections for a communication device and other parties to the communication, such as other communication devices or entities associated with the network. The third generation partnership project (3GPP) has defined use of the GPRS for offering IP connectivity to IMS services.

U.S. patent application Ser. No. 2002/0150091, filed on 17 Apr. 2001, in the name of Lopponen et al., discusses about a packet mode, e.g. IP, group communication service layer provided on top of a standard mainstream cellular network.

Using a service typically requires knowing parameters and/or other information relating to the service. Examples of such parameters may relate to, but are not limited to, parameters of multimedia messaging service (MMS), parameters of application servers, parameters or parameters associated with PoC floor control. These parameters may be, for example, operator specific, server specific, end-user specific or group specific.

A network operator may configure or provide parameters in a communication device. So-called over-the-air (OTA) provisioning may typically be used for providing parameters in activation of a new service or application, at network provisioning, and so on. A non-limiting example may comprise activating a multimedia messaging service in a mobile communication device for the first time and the operator sending operator specific MMS parameters using a short message service (SMS) message. The operator specific MMS parameters may then be stored in a memory of the device automatically, semi-automatically or manually. A communication device may be provided with parameters also, for example, by entering parameters at device manufacturing, entering parameters manually or electronically in a point of sales or using a pre-configured subscriber identity module (SIM) card, and so on. These methods of providing parameters may be suitable for providing a communication device with permanent parameters, or parameters having a long lifetime or being suitable for wide range of service usage.

Parameters for shorter usage, for example relating to only one session, may be negotiated every time when a service session is established or set up. Furthermore, parameters may depend on a network a communication device is currently in contact with or parameters that cannot be specified by the operator. An example of such shorter usage parameters may comprise negotiating speech coding and decoding parameters for a particular connection. A connection device may be configured to negotiate the parameters without user intervention. However, negotiating parameters within the session establishment may add delay to session establishment or set-up procedure, which may lead to weaker end user quality perception.

It is known, that communication devices are able to roam, or in other words to move from a network of one operator, such as a home network, to a network of another operator, such as a visited network. Also, a communication device controlled by one operator may be in connection with one or more communication devices controlled by one or more other operators. Therefore, it may happen, for example, that a communication device is provided with permanent parameters for a service relating to a first operator, but these parameters are not valid for the same service in a network of a second operator. If parameters are unknown, if the parameters are incorrect or if the parameters relate to another server than a serving server, a poor or faulty operation may result and the service may be hard or even impossible to use. Incorrect or missing parameters may result in poor user experience, even if the service works. On the other hand, negotiating parameters in session establishment always when roaming in a visited network, might add significant delays to session establishment. Similarly negotiating parameters always regardless whether in home network or visited network may add significant delays to session establishment.

It shall be appreciated that these issues are not limited to any particular communication environment, but may occur in any appropriate communication system.

SUMMARY OF THE INVENTION

Embodiments of the invention aim to address one or several of the above problems or issues.

In accordance with an aspect of the invention, there is provided a method for obtaining parameters relating to a service provided in a communication system. The method comprises storing a first set of parameters relating to a service, the first set of parameters being valid when the service is controlled by a first network. The method further comprises determining whether a second set of parameters is needed, the second set of parameters relating to said service and being valid when said service is controlled by a second network. The method further comprises obtaining the second set of parameters, when needed.

In accordance with another aspect of the invention, there is provided a communication device for becoming a party of a service provided in a communication system. The communication device is configured to store a first set of parameters relating to a service, the first set of parameters being valid when the service is controlled by a first network. The communication device is further configured to determine whether a second set of parameters is needed, the second set of parameters relating to said service and being valid when said service is controlled by a second network. The communication device is further configured to obtain the second set of parameters, when needed.

In an embodiment, the first set of parameters may comprise at least one parameter corresponding to at least one parameter of the second set of parameters.

In an embodiment, determining may comprise determining whether the service is controlled by the first network or by the second network. In an embodiment, the first set of parameters may be used in becoming a party of the service, when the step of determining shows that the service is controlled by the first network. In an embodiment, at least one of the parameters of the second set of parameters may be used instead of the at least one corresponding parameter in the first set of parameters in becoming a party of the service, when determining shows that the service is controlled by the second network. Becoming the party of the service may comprise at least one of requesting the service, joining the service or being invited to become a party of the service.

In an embodiment, determining may comprise comparing a network identifier of the network controlling the service and a network identifier of a user identity of a user becoming a party of the service. The second set of parameters may be obtained, when the step of determining shows that the network identifier of the network controlling the service is different from the network identifier of the user identity of the user becoming the party of the service.

In an embodiment, determining may comprise comparing a network identifier of the network controlling the service and a network identifier of the first network. The second set of parameters may be obtained, when the step of determining shows that the network identifier of the network controlling the service is different from the first network.

In an embodiment, comparing network identifiers may comprise comparing domain parts of uniform resource identifiers (URI).

In an embodiment, the type of the service to be provided may be determined.

The second set of parameters may be obtained by negotiating the second set of parameters, requesting for the second set of parameters or receiving the second set of parameters.

In an embodiment, at least one second set of parameters may be stored. In an embodiment, parameters relating to service sessions participated in may be stored. In an embodiment, it may be verified whether the at least one second set of parameters stored comprises a second set of parameters relating to the network controlling the service, when the step of determining shows that the second set of parameters is needed.

In an embodiment, the first set of parameters are valid when the service is controlled by a home network. The first set of parameters may be received using an over-the-air interface, for example cell broadcast, short message service, unstructured supplementary services data or general user datagram protocol transport service, hypertext transfer protocol (HTTP) or synchronization markup language (SyncML). In an embodiment, the first set of parameters may be received by entering parameters at device manufacturing, entering parameters manually or electronically or using a pre-configured identity module. In an embodiment, the first set of parameters is received from a home network. The first set of parameters may be received when the service is subscribed or when parameters of the service change.

In an embodiment, parameters may relate to at least one of a service supported by a server in a session initiation protocol controlled network, a service supported by a server in the Internet multimedia subsystem, a multiparty conferencing service and a push-to-talk over cellular service. In an embodiment, parameters may comprise a timer parameter, a parameter for automatic login, a parameter supporting simultaneous sessions and/or a parameter supporting a pre-established session.

In another embodiment, the second set of parameters may be discarded after a termination of a service session, which the second set of parameters related to.

In accordance with another aspect of the invention, there is provided a computer program comprising program code means for performing any of the steps of the above method when the program is run on a computing means.

In accordance with another aspect of the invention, there is provided a method for controlling provision of a service provided in a communication system. The method comprises receiving a request for providing a service to a user of a client, the service being controlled by a network of the communication system using at least one controlling network dependent parameter. The method further comprises verifying whether the user of the client belongs to the network controlling provision of the service. The method further comprises determining whether the client needs to be provided with a set of parameters, the set of parameters relating to the service, when the step of verifying shows that the user of the client belongs to another network than the network controlling the provision of the service. The method further comprises providing the set of parameters, when the step of determining shows that the client needs to be provided with the set of parameters.

In accordance with another aspect of the invention, there is provided a computer program comprising program code means for performing any of the steps of the above method when the program is run on a computing means.

In accordance with another aspect of the invention, there is provided a controller network entity for controlling provision of a service provided in a communication system. The controller network entity is configured to receive a request for providing a service to a user of a client, the service being controlled by a network of the communication system using at least one controlling network dependent parameter. The controller network entity is further configured to verify whether the user of the client belongs to the network controlling provision of the service. The controller network entity is further configured to determine whether the client needs to be provided with a set of parameters, the set of parameters relating to the service, when the step of verifying shows that the user of the client belongs to another network than the network controlling the provision of the service. The controller network entity is further configured to provide the set of parameters, when the step of determining shows that the client needs to be provided with the set of parameters.

In accordance with another aspect of the invention, there is provided a communication system configured to provide a service, the service being controlled by a network of the communication system using at least one controlling network dependent parameter. The communication system is further configured to provide a first set of parameters, the first set of parameters being valid when the service is controlled by a first network. The communication system is further configured to determine whether a second set of parameters is needed, the second set of parameters relating to said service and being valid when said service is controlled by a second network. The communication system is further configured to provide the second set of parameters, when needed.

BRIEF DESCRIPTION OF THE DRAWINGS

The invention will now be described in further detail, by way of example only, with reference to the following examples and accompanying drawing, in which.

DETAILED DESCRIPTION OF PREFERRED EMBODIMENTS

Figure 1:
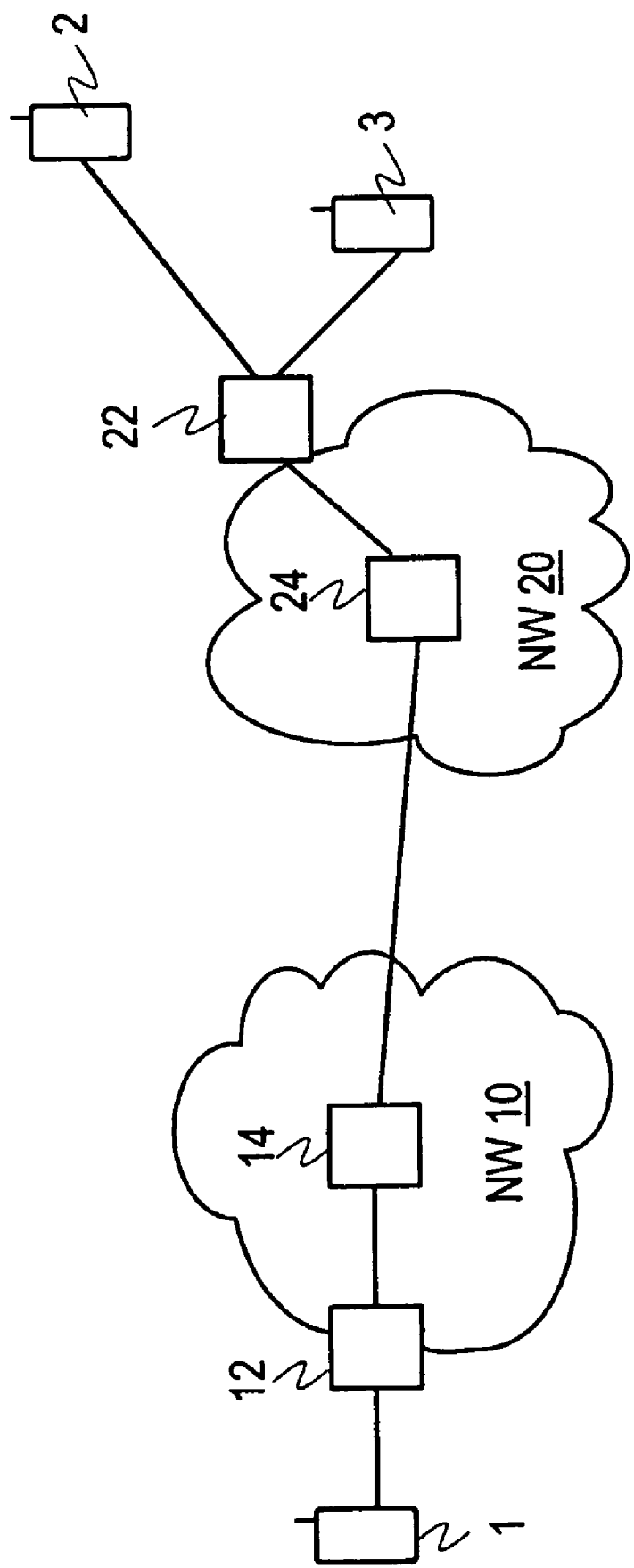
FIG. 1 shows an example of an arrangement in which the embodiments of the invention may be implemented.

FIG. 1 shows an example of an arrangement including a first communication network 10 and a second communication network 20, a first communication device 1, a second communication device 2 and a third communication device 3. The first communication device 1 is shown to access the first communication network 10 via an access entity 12. The first communication device 1 may, for example, wirelessly transmit and receive radio signals via a radio interface to and from a transceiver network element connected to the access entity 12. Correspondingly, the transceiver network element may wirelessly transmit and receive radio signals to and from the first communication device 1. Furthermore, the second communication device 2 and the third communication device 3 are shown to access the second communication network 20 via an access entity 22.

A communication device may act as an originating end initiating a communication session or as a terminated end towards which the originating end initiated the session. The communication networks typically comprise various switching and other control entities and gateways for enabling the communication for interfacing a single communication network with one or more communication networks. In order to enhance clarity, these control entities are not shown in FIG. 1 but only a line is used to denote the interface between the networks 10 and 20. The communication networks 10 and 20 may interface directly each other or though further communication network(s).

A first application server 14 relating to at least a first service is shown in a domain of the first communication network 10. A second application server 24 relating to at least a second service is shown in a domain of the second communication network 20. In embodiments of the invention, an application server is an entity controlling and supporting provision of a service.

It shall be appreciated that FIG. 1 is only an example showing three individual communication devices and two communication networks each having only one application server in their domain. The number and type of these entities may differ substantially from that which is shown. A communication system is typically arranged to serve a plurality of communication devices. Furthermore, a communication device may have several simultaneous communication sessions, for example a number of SIP sessions and activated packet data protocol (PDP) contexts. Communication devices may be connected to the communication system from the same or different networks. The communication devices may access the communication network 10 via any appropriate access system. Examples may include, but are not limited to, radio access networks, e.g. an UMTS terrestrial radio access network (UTRAN) or a GSM/EDGE radio access network (GERAN), and short-range wireless systems, such as the Bluetooth, different types of fixed access systems, and so on.

An end-user may access a communication network by means of any appropriate communication device, also called terminal. Examples may comprise user equipment (UE), a mobile station (MS), a cellular phone, a personal digital assistant (PDA) and a personal computer (PC). Further examples may comprise any other equipment operable according to a suitable network or transport protocol, such as a Session Initiation Protocol (SIP), a Real-Time Transmission Protocol (RTP), a File Delivery over Unidirectional Transport (FLUTE), a wireless applications protocol (WAP) or a hypertext transfer protocol (HTTP).

A communication device may be provided with an antenna or other such transceiver and receiver means for wirelessly receiving and transmitting signals from and to a transceiver network element of a wireless communication system. A communication device may also be provided with a display and a speaker. The operation of a communication device may be controlled by means of a suitable user interface comprising control means, such as a keypad, voice commands, touch sensitive screen or pad, or combinations thereof, or the like. The user interface may display a user a menu, a list or the like and allow the user to select an option from the menu. The user may indicate the selection by using the control means. The user interface may detect user activity and communicate the selection to a communicating logic of the communication device. A communication device is typically provided with a processor and memory means as well as software and applications operating the device and enabling operation with other entities. Software, which is able to request services from other entities in a communication system, may be called a client.

The communication networks 10 and 20 may comprise any appropriate communication networks, for example networks operable according to a network or transport protocol mentioned above. In an embodiment, the communication networks 10 and 20 shown in FIG. 1 are session initiation protocol (SIP) controlled networks. Further, in an embodiment, the first communication network 10 and/or the second communication network 20 are provided at least in part by the Internet multimedia subsystem (IMS). In the IMS, a SIP based connection control is handled by SIP proxies called Call State Control Functions (CSCFs, not shown in the figure). In an embodiment, a general packet radio service (GPRS) based system is used as a backbone communication network enabling the IMS services. Another appropriate mobile communication system may be used as well.

Names of the entities in a communication system depend on the system. For example, access entities of radio access networks may comprise a controller, such as a radio network controller (RNC) in 3GPP (Third Generation Partnership Project) systems and base station controller (BSC) in 3GPP2 (Third Generation Partnership Project 2) systems. Furthermore, even if omitted from FIG. 1, a communication system typically comprises various further switching and other control entities and gateways for enabling the communication via a number of radio access networks and also for interfacing a single communication system with one or more other communication systems. Several transceiver network elements, in other words transmitter/receivers, such as Node B in 3GPP, BTS (base transceiver station) in 3GPP2, may be included in a single radio access network.

The Session Initiation Protocol (SIP) is an application layer control protocol defined by the Internet Engineering Task Force (IETF) for creating, modifying and terminating sessions with one or more participants. A user connected to a SIP base communication system may communicate with various entities of the communication system based on standardized SIP messages. Communication devices or user who run certain applications on the communication devices are registered with the SIP backbone so that an invitation to a particular session can be correctly delivered to these end points. The SIP provides a registration mechanism for devices and users and it applies mechanisms such as location servers and registrars to route the session invitations appropriately.

Uniform Resource Identifiers (URIs) are used to identify different types of actors in a SIP-controlled network. Typically a URI points to a registered user identity of an individual user. A URI may identify also services, such as voicemail server or conference factory URI, conferencing instances, such as chat rooms or voice-over-IP (VoIP) conferencing instances, or other types of resources.

Embodiments of the invention may be implemented, for example, in multiparty conferencing services, such as PoC services. A PoC system may be integrated within a cellular telecommunication system and may be implemented using push-to-talk servers in the IMS. The PoC service is based on multi-unicasting. Each transmitting communication device may send packet data traffic to a dedicated push-to-talk server or PoC server. In case of a group call, the server may duplicate or multiply the traffic to be received by all recipients. Principles of the invention may be implemented also in other multiparty conferencing services or in any other appropriate services.

The PoC uses half-duplex transmission technology. Thus, one user subscribing the PoC service, i.e. a first PoC subscriber, and belonging to a group may speak at the time and the other PoC subscribers belonging to the group may listen, but may not talk at the same time. The first PoC subscriber may select a person or groups of persons to talk to, for example, from a directory or the like provided in a communication device the first PoC subscriber is using. The first PoC subscriber may press and hold a push-to-talk key on the communication device to start talking. The first PoC subscriber can now talk for as long as the first PoC subscriber holds the key. The push-to talk key may be a specific button, tangent or any other appropriate key in a user interface. Similar principles apply with devices having touch sensitive or sound activated user interfaces. As soon as the first PoC subscriber releases the push-to-talk key, another member of the group may reserve a turn to speak. Talk bursts in the PoC conferences are usually connected without the recipient answering and typically received through a built-in loud speaker of a communication device. Bi-directional communication may be offered since all parties of the communication session may similarly communicate voice data with an entity controlling the PoC session.

In the PoC, for example, different types of groups may be established. Group types may comprise ad-hoc, pre-arranged, chat, one-to-one (1-to-1) and other defined or undefined group types. A group of communication devices for multiparty conferencing, such as the PoC, can be created in various ways. For example, the SIP or a conference policy control protocol (CPCP) may be used.

An ad-hoc group is temporary. The parameters of an ad-hoc group may not be valid after the communication session to which the parameters relate is over. An ad-hoc group communication may be established when a first PoC subscriber selects more than one other PoC subscribers and invites them to participate in an ad-hoc group communication. Voice communication may be started after one other PoC subscriber the first PoC subscriber invited, i.e. a second PoC subscriber, accepts the invitation. To participate in an existing ad-hoc PoC group session, a new participant typically needs an invitation from a current ad-hoc PoC group session participant. An exception is that a PoC subscriber, who was a participant of the ad-hoc group session, but left the session, may join in again without an invitation.

A chat PoC group session is established when a first PoC subscriber joins in. Voice communication is possible at the time the chat PoC group session is established. A PoC subscriber may establish a chat PoC group session or join into an ongoing chat PoC group session.

On the other hand, a pre-arranged group is permanent. A recipient client may store parameters of a pre-arranged group for later use, e.g. to initiate or participate to a new group communication. Participation in a pre-arranged group is typically restricted to the members of the group. The members may be invited to a pre-arranged PoC group session or may join an ongoing session. A PoC session between pre-arranged PoC group members may be established when any individual member of the same pre-arranged PoC group invites the group. Voice communication may be started after one other PoC subscriber the first PoC subscriber invited, i.e. a second PoC subscriber, accepts the invitation.

As was mentioned earlier, using a service typically requires knowing parameters or other information relating to the service. Parameters may be permanent or initial parameters provisioned once or rarely. Initial parameters may be provisioned over the air, for example. Other parameters may be temporary parameters negotiated with the session establishment, for example using an appropriate SIP method or by including the parameters in a session description protocol (SDP) body of a SIP message.

It shall be appreciated that in this specification, terms negotiating or obtaining may comprise requesting and/or receiving information in a two-way "request-offer" negotiation or a one-way negotiation, such as informing, indicating or including information, and so on.

In embodiments of the invention, the first and the second service use at least one same parameter. In an embodiment, the first and the second service may be at least partly the same service, for example a PoC service. In embodiments of the invention, the first application server is operated by a different operator than the second application server. Thus, the at least one same parameter may get a different value relating to the first application server than to the second application server. For example, in a PoC service, a parameter may comprise a PoC talk burst timer value. Thus, relating to the first application server, the certain specific PoC talk burst timer value may be, for example, 3 s (seconds) and relating to the second application server, the certain specific PoC talk burst timer value may be, for example, 5 s.

When the over the air (OTA) provisioning is used to indicate server parameters, the parameters are valid only in a home network associated with a communication device. This is naturally direct consequence from the fact that operator may provide to subscribers of the operator only the parameters that are used in an own network of the operator. The operator typically may not have knowledge on the parameters that other operators, that is the competitors, are using. Consequently, the parameters may not be valid in every case and for every service.

In case of PoC, a concept of a participating PoC server and a controlling PoC server has been defined. The participating PoC server is usually the first contact point for a participating client. The participating PoC server resides in the home network of each participating client. The controlling PoC server is the application server taking the control over the PoC session. The controlling PoC server may reside either in the home network or in a visited network (i.e. in a domain of another operator). As group services, such as PoC, usually involve multiple participants often being subscribers of different operators, it is likely that for most of the participants the controlling server is not located in their home network. Location of the controlling PoC server may depend on the PoC session type and on terminating or originating parties. Therefore, for ensuring validity of parameters used for a PoC session parameters may need to be negotiated within the session establishment, for example when the location of the controlling PoC server is not known. However, as noted above, negotiating parameters within session establishments may add significant delay to session establishment or setup procedure.

Embodiments of the invention provide a mechanism allowing a communication device or another entity in a communication system to determine whether parameters known to the entity, such as parameters obtained using the OTA, may be used in connection with a requested service. New parameters are indicated or requested, for example negotiated within a session establishment, only if the known parameters may not be used.

Permanent, long-term, wide range usage or initial, or the like, parameters, also referred to as initial parameters or a first set of parameters, may be provided to a client over the air (OTA), for example, according to Open Mobile Alliance OMA-WAP-ProvCont-v1_1-20021112-C, Provisioning Content Version 1.1, Version 12 Nov. 2002. OTA configuration parameters may be delivered to a communication device, for example, using cell broadcast, short message service (SMS), unstructured supplementary services data (USSD) or general user datagram protocol (UDP) transport service (GUTS). Furthermore, hypertext transfer protocol (HTTP) or synchronization markup language (SyncML), or other suitable means may be used. SyncML is an open industry standard for universal synchronization of remote data and personal information across multiple networks, platforms and devices.

Furthermore, other means of provisioning initial parameters may comprise, for example, entering parameters at device manufacturing, entering parameters manually or electronically in a point of sales or using a pre-configured identity module, such as subscriber identity module (SIM), universal subscriber identity module (USIM), IP multimedia services identity module (ISIM), wireless identity module (WIM), universal integrated circuits cards (UICC), and so on.

The initial parameters, or the first set of parameters, are usually sent to a client only once or rarely. For example, when a service is taken into use or is subscribed, a service provider typically provides the first set of parameters for the service in question. Later updated first set of parameters may be sent if the service provider changes the parameter values.

Based on group call session type, a client may include negotiation of session parameters procedure for obtaining a second set of parameters within session establishment in the originating side. Furthermore, parameters negotiated or obtained otherwise may be stored in a memory means of a communication device. The stored parameters may be considered as known parameters later.

Based on information on the home network of the client, such as a domain name, a controlling server may include negotiation of session parameters procedure for obtaining or informing a second set of parameters within session establishment in the terminating side.

In an embodiment, the client and the controlling server may collect history information that is bound to groups and/or members of group of earlier sessions for determining whether to start session parameter negotiation procedure or not.

For determining whether a second set of parameters are needed, a client and a server may investigate a network identification. In an embodiment, a group session URI is investigated and it is checked whether a domain of the group session URI matches with a domain of a public user identity of the client. An exemplifying group session URI may have a form service_123@operator1.net, wherein "operator1.net" is the domain. An exemplifying public user identity of a client may have a form forename.surname@operator1.net, wherein "operator1.net" is again the domain. In an embodiment, the client and the server may investigate a group session URI and check whether history information that is bound to groups and members of groups of earlier sessions comprises information bound to the session to be established or to the domain in which the session is to be established.

In an embodiment, the PoC service is taken as an example. Parameters that are used in the PoC service may be delivered by using the OTA method based on Open Mobile Alliance (OMA) client provisioning (CP) and/or device management (DM). These parameters provide the first set of parameters as named above. This can be done regardless whether parameters are used by a participating or controlling PoC server and regardless whether the controlling PoC server resides in a home network or in a visited network. In other words, the first set of parameters is configured in advance and not per session basis. Therefore, a mechanism is needed and proposed in embodiments of the invention to know when the first set of parameters can be used.

In session establishment, depending on a PoC session type to be established, it is determined whether the first set of parameters can be used for the session in question. If the first set of parameters cannot be used, a second set of parameters is requested, for example using the negotiation. The second set of parameters, which are negotiated per session basis, are used only for the session in question. The second set of parameters does not permanently replace the first set of parameters, such as the OTA parameters, in the client.

An originating client may make a local decision whether to negotiate the parameters or not. The originating client may use the session type as a criterion for the decision. For example, when the session type is an ad-hoc group session and a 1-to-1 PoC session, there may be no need to negotiate the parameters. The first set of parameters can be assumed to be valid as the controlling PoC server resides at a home network. In this case, the originating client may use the first set of parameters delivered initially, for example, using the OTA.

The controlling PoC server may make a local decision whether to negotiate or indicate the parameters or not. Typically the server negotiates or indicates the parameters with the clients of another network. The server may also have previous information, for example based on a history list of sessions initiated by originating clients or participated by terminated clients with a timestamp, of previous negotiations. The server may make a decision of negotiation or re-negotiation based on this information. For example, there is no need to negotiate parameters for clients known to have already the parameters that are valid for the controlling PoC server. In some embodiments, parameters may need to be negotiated e.g. with an appropriate SIP method, whilst in some embodiments the controlling server may just indicate the parameters to the client, e.g. by including them in the SDP within an appropriate SIP message.

In an embodiment, for a pre-arranged PoC group session and a chat PoC group session, the controlling PoC server may reside at visited network. Parameters may be negotiated within the session establishment procedure.

In an embodiment, a client in a communication device may use information obtained from an URI of a group, for example a pre-arranged group or chat group, with which the client is going to have a session. If the domain name in the group URI is the same as the domain of a public user identity of a user of the client, then the client may conclude that the group resides at the home network. The parameters provided in the OTA message are assumed then correct and can be used for the session.

In a further embodiment, the controlling PoC server controlling a group session, such as a pre-arranged session or a chat group session, may reside in the home network or in the visited network. The client may store parameters relating to sessions the client participates to. If the client has earlier participated to the group session and has stored the parameters for the session, the client may decide to use those stored parameters. In this embodiment, there is no need to re-negotiate the parameters, because the terminal already knows of the parameters to be used.

Term parameter should be understood in this specification to comprise parameters, settings and any configurable variables or data, which may have different values depending on a service provider. A set of parameters may comprise one or more parameters.

In an embodiment, the first set of parameters comprises at least one corresponding to at least one parameter of the second set of parameters. In an embodiment, the first set of parameters may comprise all the parameters needed for becoming a party of a particular service. In another embodiment, the first set of parameters comprises a part of the parameters needed for becoming a party of the particular service, the part of the parameters comprising at least the at least one corresponding parameter, which is the same for the first set and the second set. In an embodiment, the second set of parameters may comprise all the parameters or only a part of the parameters needed for becoming a part of a particular service. If it is determined that parameters of the second set of parameters need to be used, at least one of the parameters of the second set of parameters may be used instead of the corresponding parameter in the first set of parameters.

Examples of parameters may comprise, but are not limited to, timers, such as:

Talk_Burst_Release_Timer,

Talk_Burst_Request_Timer,

PoC_Client_Retry_After_Timer,

PoC_Client_End_RTP_Media_Timer.

Figure 2:
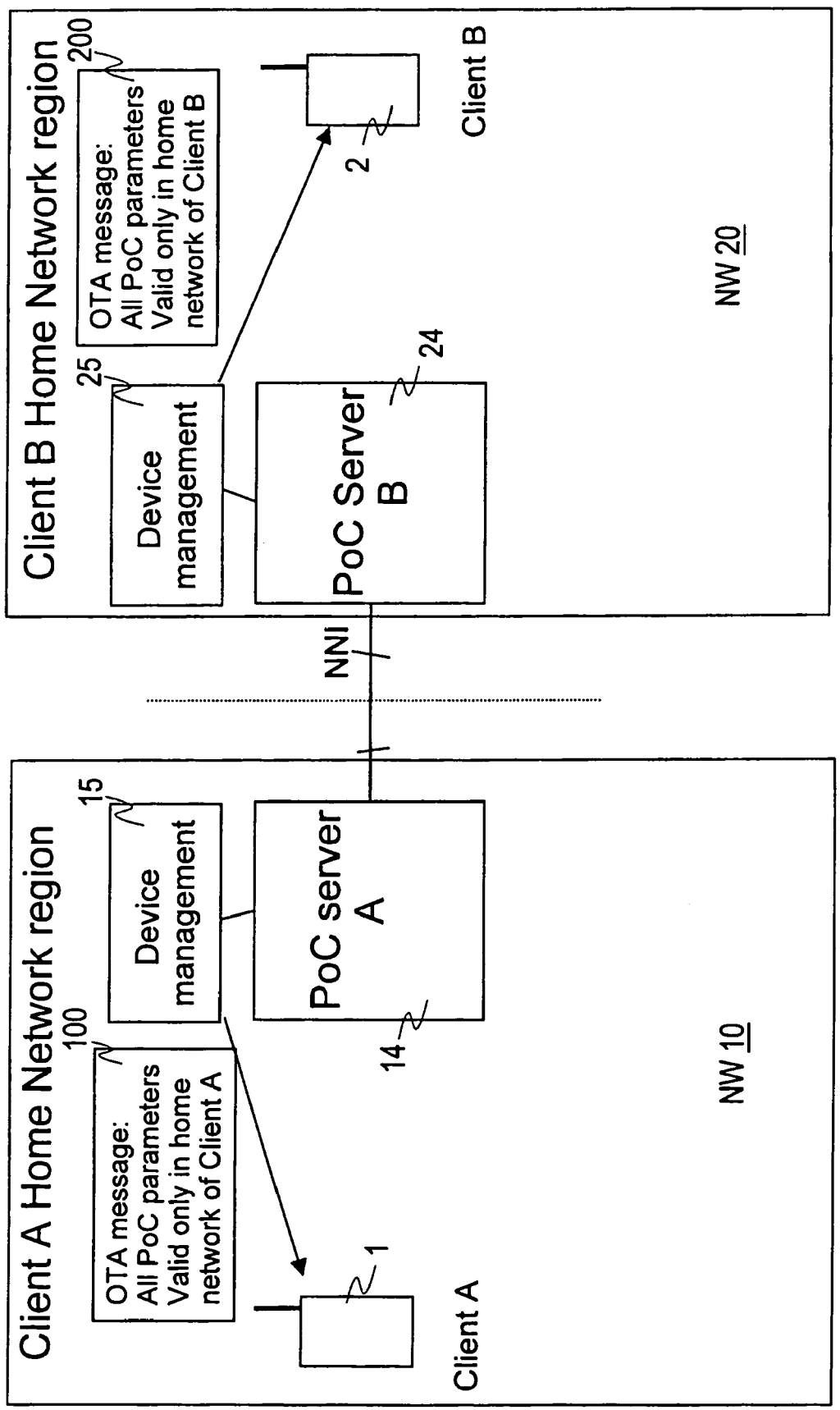
FIG. 2 shows a block diagram of an embodiment of the invention.

FIG. 2 shows an arrangement according to an embodiment of the invention for providing a first set of parameters. In the embodiment of FIG. 2, the PoC is used as an exemplifying service. It shall be appreciated, however, that the parameters referred to herein may relate to any other appropriate service provided in a communication system.

In FIG. 2, a first PoC server 14, located in a home network 10 of client A, is associated with a device management 15. The device management delivers PoC parameters in an OTA message 100 to client A in a first communication device 1. The PoC parameters delivered in the OTA message 100 are only valid in the home network of client A. Furthermore, a second PoC server 24, located in a home network 20 of client B, is associated with a device management 25. The device management delivers PoC parameters in an OTA message 200 to client B in a second communication device 2. The PoC parameters delivered in the OTA message 200 are only valid in the home network 20 of client B. The networks 10 and 20 may communicate through a network-to-network interface NNI.

FIG. 2 is used in the following examples as a starting point. Therefore, it is assumed that, in the following examples, client A has initial parameters, i.e. a first set of parameters, relating to the PoC service when the POC service is controlled by the home network 10 of client A. Furthermore, it is assumed that client B has initial parameters, i.e. a first set of parameters, relating to the PoC service when the POC service is controlled by the home network 20 of client B.

Figure 3:
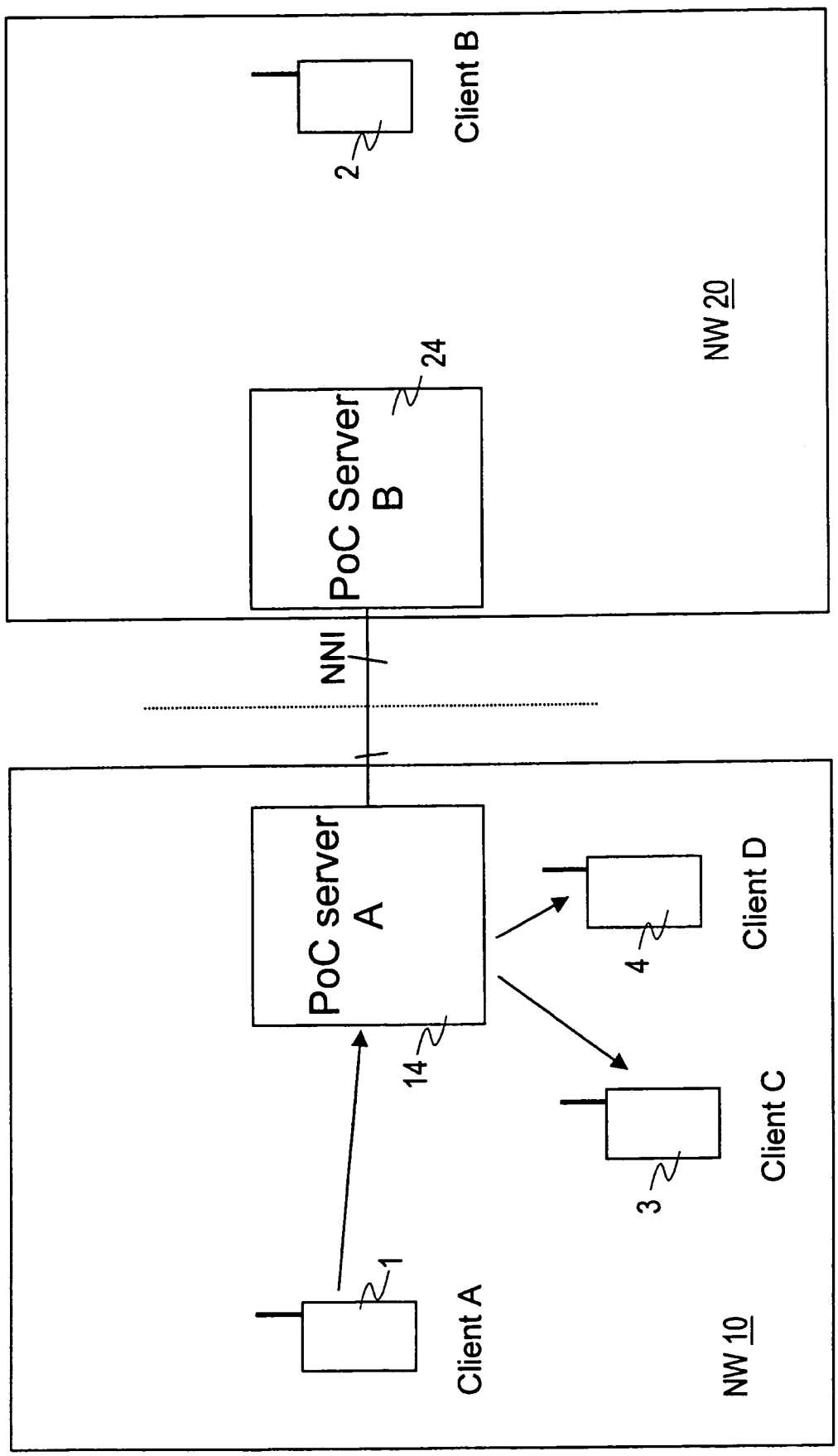
FIG. 3 shows a block diagram of a further embodiment of the invention.

FIG. 3 shows the arrangement of FIG. 2 provided with further communication devices according to an embodiment of the invention. Client A in the first communication device 1 originates a session, such as a PoC session, towards two terminated ends comprising client C in a third communication device 3 and client D in a fourth communication device 4. In the embodiment of FIG. 3, it is first assumed that the session is controlled by the first PoC server 14 of the home network 10 of client A. Therefore, parameters delivered in the OTA message 100 to client A are valid and client A may use said parameters.

In respect of terminated end, the controlling server 14 may determine whether a second set of parameters need to be informed to clients C and D. In an embodiment, it is assumed that the network 10 is the home network of client C, as well. Therefore, client C has also obtained initial parameters, for example in an OTA message, which are valid for this session. No new parameters need to be informed to client C in this embodiment.

Furthermore, it is assumed that the home network of client D is another network. Therefore, client D may have not obtained initial parameters, which are valid for this session. The controlling server may verify whether client D may be assumed to have the correct parameters for some other reason. For example, the controlling server may have stored information on participants of earlier sessions. The controlling server may note that client D has participated earlier in the same group. Therefore, the controlling server may assume that client D already has correct parameters and no new parameters need to be informed to client D. In an alternative, the controlling server may note that the server has no information relating to client D. In this alternative, the controlling server informs the parameters to client D.

In the embodiment of FIG. 3, in an alternative the session may be controlled by the second PoC server 24 or even another server (not shown). An example of a session where such a situation may be possible may comprise, but is not limited to, pre-arranged group session. A pre-arranged group may be defined at a visited network, i.e. other than the home network of participating clients. The controlling PoC server would therefore reside at said visited network even though at that moment all the clients were from the home network. In this situation, the server and/or the clients may verify whether they already have parameters for the session in question, for example obtained from earlier sessions. If yes, it may be assumed that no new parameters are needed even if the controlling server and the clients are of different networks.

In other words, in a 1-to-1 PoC session and an ad-hoc PoC session the controlling server is defined to be the PoC server at the network of the originating client. For pre-arranged group or chat group PoC session, or other such predetermined sessions, the controlling server is the server of the network in which the session is predetermined. For example for pre-arranged group or chat group PoC session, the controlling server may be one of the PoC server in the network of the originating client, the PoC server in the network of one of the terminated clients or another PoC server in another network.

Figure 4:
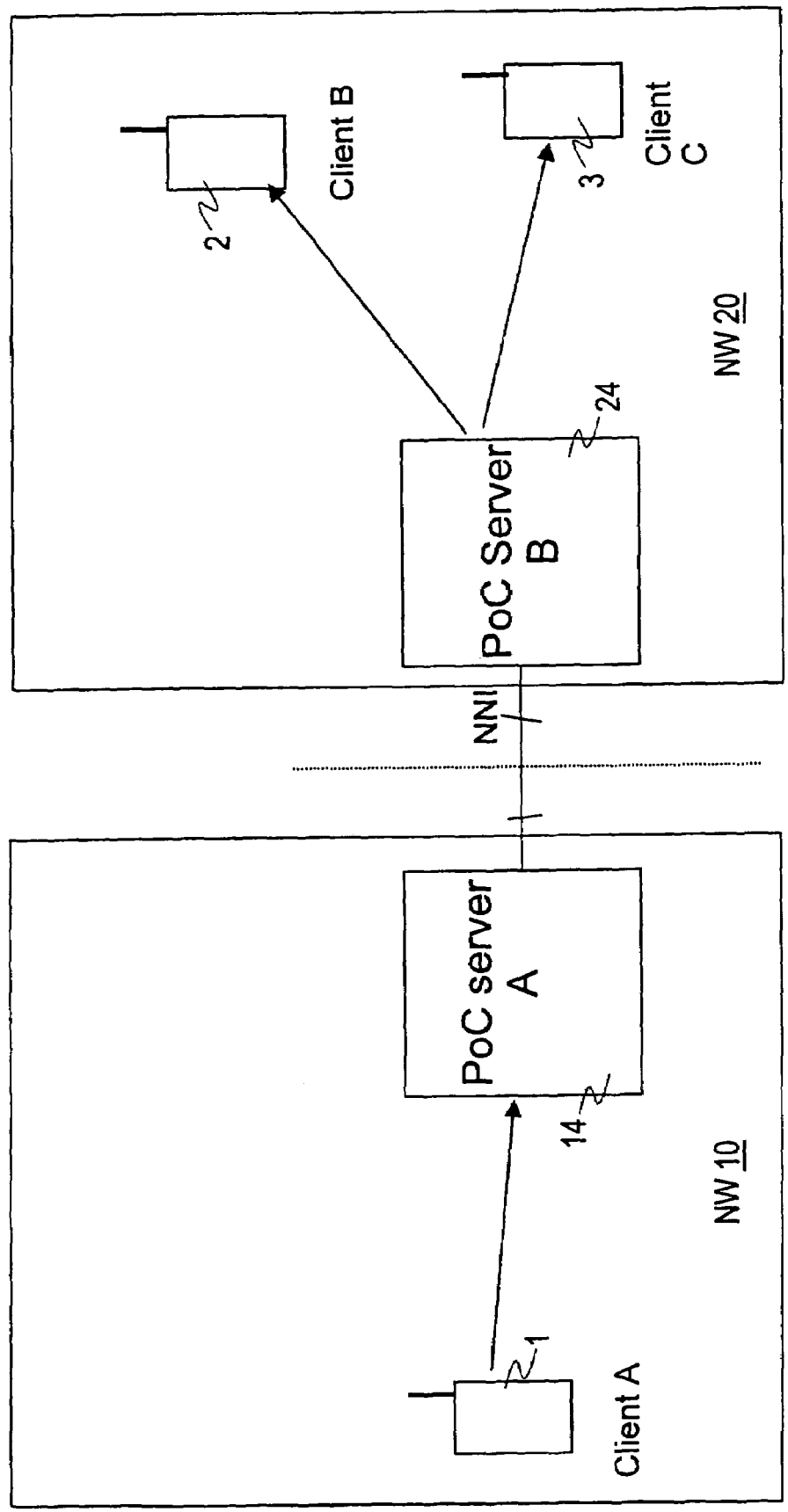
FIG. 4 shows a block diagram of a further embodiment of the invention.

FIG. 4 shows the arrangement of FIG. 2 provided with further communication devices according to an embodiment of the invention. In FIG. 4, client A in the first communication device 1 resides in the home network 10 of client A. Client B on the second communication device 2 resides in the home network 20 of client B. Client C in the third communication device 3 also resides in the home network 20 of client B. In the following examples, it is assumed that the home network of client C is another network than network 10 or network 20.

In a first embodiment of FIG. 4, client A may establish a predetermined group session, such as a PoC chat session or a PoC pre-arranged group session, towards the clients B and C. In this exemplifying embodiment, the predetermined group session is defined in the home network 20 of client B and, the second PoC server 24 becomes the controlling PoC server. However, the home network 20 of client B is a visited network for client A. As was mentioned in connection with FIG. 2, the parameters delivered in the OTA message 100 to client A are only valid in the home network of client A. Therefore, the parameters delivered in the OTA message 100 cannot be used for this session, because these parameters are not valid in the network 20. Client A may determine that a second set of parameters relating to the network 20 is needed. Client A may obtain the second set of parameters, such as PoC parameters of the second server 24, for example by negotiating at session establishment, for example by using the SIP or SDP as was explained above. Client A may determine the need for the second set of parameters, for example, by examining the group URI of the chat group or the pre-arranged group. Client A may make a decision to negotiate the parameters, when a domain name provided in the URI is different than a domain identifier, such as a domain part of the Public User Identity, relating to client A. In a second embodiment of FIG. 4, client A stores parameters used in sessions to which client A participates. These sessions are referred to as earlier sessions herein. Client A may establish a predetermined group session, such as a PoC chat session or a PoC pre-arranged group session, towards the clients B and C in a similar manner as in the first embodiment of FIG. 4. In this exemplifying embodiment, the predetermined session is again defined in the in the home network 20 of client B and the second PoC server 24 becomes the controlling PoC server. The parameters delivered in the OTA message 100 cannot be used in this session either. Client A may determine that a second set of parameters relating to the network 20 is needed, for example, by examining the group URI of the chat group or the pre-arranged group and determining that the domain name provided in the URI is different than the domain identifier relating to client A. Instead of starting to negotiate the second set of parameters, client A examines the stored parameters relating to earlier sessions and determines that an earlier session was made with the same group. Client A may make a decision to use the parameters relating to said earlier session with the same group. In a third embodiment of FIG. 4, client A stores parameters relating to earlier sessions. Client A may establish a predetermined group session, such as a PoC chat session or a PoC pre-arranged group session, towards the clients B and C in a similar manner as in the first and the second embodiment of FIG. 4. If the predetermined session is defined in the network 20, the second PoC server 24 becomes the controlling PoC server. The parameters delivered in the OTA message 100 cannot be used in this embodiment either. Client A may determine that a second set of parameters relating to the network 20 is needed, for example, by examining the group URI of the chat group or the pre-arranged group and determining that the domain name provided in the URI is different than the domain identifier relating to client A. Instead of starting to negotiate the second set of parameters, client A examines the stored parameters relating to earlier sessions and determines that no earlier session was made with the same group, but an earlier session was made with a group with the same domain name. Client A may make a decision to use the parameters relating to said earlier session towards the same domain. In a fourth embodiment of FIG. 4, the situation is considered from the point of view of the controlling server, which in these exemplifying embodiments is the second PoC server 24. The terminated end is considered first. Client A may establish a predetermined group session, such as a PoC chat session or a PoC pre-arranged group session, towards the clients B and C in a similar manner as in the previous embodiments of FIG. 4. The terminated end client B belongs to the same domain than the second PoC server 24. Client B has been provided with the initial parameters relating to the second PoC server 24 in the OTA message 200, as was explained in connection with the embodiment of FIG. 2. Therefore, client B is aware of parameters to be used and there is no need of informing the parameters to client B.

The terminated end client C belongs to another domain than the second PoC server 24. Client C has not been provided with the initial parameters relating to the second PoC server 24. Therefore, the controlling server may examine stored parameters relating to earlier sessions, if the server has stored such parameters. If the server determines that an earlier session, where client C has been participating, has taken place, the server may assume that client C has the correct parameters. If the controlling server has no information relating to client D, the controlling server may inform the parameters to client D.

The fourth embodiment of FIG. 4 is then considered in the following in respect of the originating end. In FIG. 4, the originating end, i.e. client A, belongs to another domain than the second PoC server 24, which is the controlling server in this example.

In an embodiment, client A has not been provided with the parameters relating to the second PoC server 24. The second server 24 having the control over the session may make a local decision to provide, such as negotiate or inform, the parameters to be used by client A.

In a further embodiment, client A has not been provided with the parameters relating to the second PoC server 24 by its home network. However, the second server 24 may have collected information in a history list. The second server 24 may determine that client A has earlier been provided the parameters relating to second server 24. The second server 24 may make a local decision not to provide, such as negotiate or inform, the parameters to be used by client A.

In a fifth embodiment of FIG. 4, the situation is again considered from the controlling server point of view. Client A in the first communication device 1 may establish a PoC 1-to-1 session towards client B in the second communication device 2. In PoC 1-to-1 sessions, the first PoC server 14 in the network 10 at originating end becomes the controlling PoC server. As was explained in connection with previous embodiment, client B belongs to a domain of network 20, which is a different domain than the domain of the controlling PoC server. The first PoC server 14 has the control over the session and provides, such as negotiates or informs, the parameters to be used to client B. Parameters may be provided for example using the SIP or the SDP.

The procedure according to the fifth embodiment of FIG. 4 may apply also to other temporary groups, for example, to a PoC ad-hoc group, when the PoC server at originating end becomes the controlling PoC server.

Figure 5:
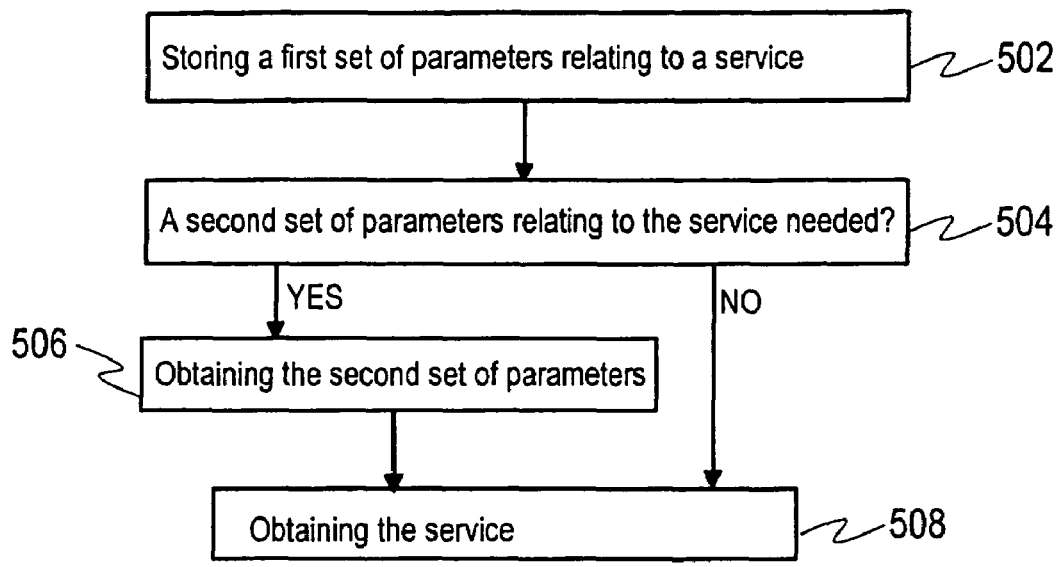
FIG. 5 shows a flow chart of an embodiment of the invention.

FIG. 5 shows a flow chart of an embodiment of the invention. The embodiment of FIG. 5 may be seen from a point of view of a communication device. In an alternative, a part of the steps may be performed by another entity of the communication system, such as a controller network entity. In step 502, a first set of parameters relating to a service is stored, the first set of parameters being valid when the service is controlled by a first network. In an embodiment, the first set of parameters may be stored in a memory of the communication device. In step 504, it is determined whether a second set of parameters is needed, the second set of parameters relating to said service and being valid when said service is controlled by a second network. In an embodiment, the determining step is performed in the communication device, for example by means of a processor. In an alternative, the determining step may be performed by the controller network entity. If the determining shows that the second set of parameters is needed, the second set of parameters is obtained for in step 506. In step 508, the service may be obtained using at least a part of the first set of parameters and/or the second set of parameters. If the determining shows that the second set of parameters is not needed, step 508 may be performed directly.

In step 504, it may be determined whether the service is controlled by the first network or by the second network.

In an embodiment, in step 508, the first set of parameters is used in becoming a party of the service, when it is found in the step 504 that the service is controlled by the first network. The first set of parameters may comprise all the parameters needed for becoming a party of the service or a part of the parameters needed for becoming a party of the service.

In a further embodiment, at least one of the parameters of the second set of parameters may be used instead of the at least one corresponding parameter in the first set of parameters in becoming a party of the service, when it is found in step 504 that the service is controlled by the second network.

In an embodiment, the step of 504 may be performed by comparing a network identifier of the network controlling the service and a network identifier of a user identity of a user becoming a party of the service. In an embodiment, the step 504 may be performed by comparing a network identifier of the network controlling the service and a network identifier of the first network. In an embodiment, domain parts of uniform resource identifiers (URI) are compared. Furthermore, determining in step 504 may comprise determining the type of the service to be provided, such as a type of a group in a PoC service.

Becoming the party of the service may comprise requesting the service, such as requesting an establishment of a PoC session, joining the service, such as joining a PoC session already established, or being invited to become a party of the service, such as being invited to an ongoing PoC session.

The second set of parameters may be negotiated with the controller network entity, requested from the controller network entity or received form the controller network entity without a request.

In an embodiment, the communication device stores at least one of the second set of parameters obtained for example in connection with service sessions to which the communication device has participated in. The second set of parameters may thus be obtained also from the at least one set of second parameters stored in the communication device.

In a further embodiment, the second set of parameters may be discarded after a termination of a service session, which the second set of parameters related to. In an embodiment, it may be defined that no second set of parameters shall be stored and/or used after the termination of the session.

The first set of parameters may be received for storing in the communication device using an over-the-air interface, such as by means of cell broadcast, short message service, unstructured supplementary services data or general user datagram protocol transport service, hypertext transfer protocol (HTTP) and synchronization markup language (SyncML). Other means of receiving the first set of parameters may comprise entering parameters at device manufacturing, entering parameters manually or electronically and using a pre-configured identity module.

In an embodiment, permanent parameters, which are not dependent on the controlling network, may be comprised in a third set of parameters. The permanent parameters may be used together with the first set of parameters or the second set of parameters.

Figure 6:
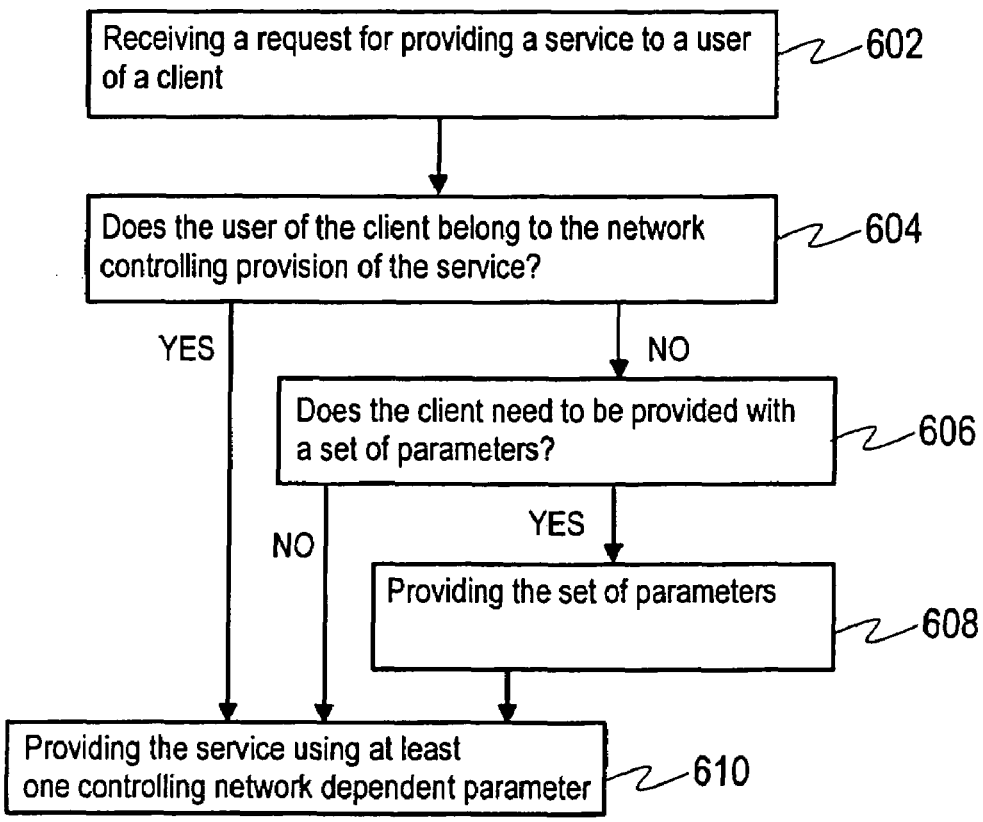
FIG. 6 shows a flow chart of a further embodiment of the invention.

FIG. 6 shows a flow chart of a further embodiment of the invention. The embodiment of FIG. 6 may be seen from a point of view of a controller network entity, such as a controlling server. In step 602, a request for providing a service to a user of a client is received, the service being controlled by a network of the communication system using at least one controlling network dependent parameter. In step 604, it is verified whether the user of the client belongs to the network controlling provision of the service. In step 606, it is determined whether the client needs to be provided with a set of parameters, the set of parameters relating to the service, when the step of verifying shows that the user of the client belongs to another network than the network controlling the provision of the service. If the determining shows that the client needs to be provided with the set of parameters, the set of parameters is provided in step 608. In step 610, the service may be provided using the at least one controlling network dependent parameter. If the determining shows that the client does not need to be provided with the set of parameters, step 610 may be performed directly. It shall be appreciated that the controlling network entity may be an entity of the home network of the user of the client requesting the service or an entity of another network.

Embodiments of the invention may at least partially be realized in an appropriate communication device and/or in an appropriate network entity by means of a computer program. The computer program may comprise program code means for performing steps according to said embodiments when the program is run on a computing means.

Although the invention has been described in the context of particular embodiments, various modifications are possible without departing from the scope and spirit of the invention as defined by the appended claims. It should be appreciated that whilst embodiments of the present invention have mainly been described in relation to mobile communication devices such as mobile stations, embodiments of the present invention may be applicable to other types of communication devices that may access communication networks. Furthermore, embodiments may be applicable to other appropriate communication systems, even if reference has mainly been made to mobile communication systems and in particular to PoC systems.

The invention claimed is:

1. A method, comprising:
receiving with a processor a first set of parameters relating to a service, wherein the first set of parameters is valid when the service is controlled by a first network;
determining with a processor whether a second set of parameters is needed after a session is established by comparing a network identifier of a network controlling the service with a network identifier of a user identity of a user becoming a party of the service, wherein the second set of parameters relating to said service is valid when said service is controlled by a second network; and
initiating obtaining with a processor the second set of parameters, when the network identifier of the network controlling the service is different from the network identifier of the user identity of the user becoming the party of the service.

2. The method according to claim 1, wherein the first set of parameters comprises at least one parameter corresponding to at least one parameter of the second set of parameters.

3. The method according to claim 1, wherein the determining comprises determining whether the service is controlled by the first network or by the second network.

4. The method according to claim 3, further comprising:
using the first set of parameters to establish a party of the service, if the service is controlled by the first network.

5. The method according to claim 4, wherein becoming the party of the service comprises at least one of requesting the service, joining the service or being invited to become a party of the service.

6. The method according to claim 3, further comprising:
using at least one of the parameters of the second set of parameters in establishing a party of the service, when the service is controlled by the second network.

7. The method according to claim 1, wherein the determining comprises comparing domain parts of uniform resource identifiers.

8. The method according to claim 1, wherein the determining comprises comparing a network identifier of the network controlling the service with a network identifier of the first network.

9. The method according to claim 8, wherein the obtaining comprises obtaining the second set of parameters, when it is determined the network identifier of the network controlling the service is different from the first network.

10. The method according to claim 1, wherein the determining further comprises determining a type of the service provided.

11. The method according to claim 1, wherein the obtaining comprises at least one of negotiating the second set of parameters, requesting the second set of parameters, or receiving the second set of parameters.

12. The method according to claim 1, further comprising:
storing at least one second set of parameters.

13. The method according to claim 12, wherein the storing the at least one second set of parameters comprises storing parameters that relate to service sessions participated in by a user.

14. The method according to claim 12, wherein the obtaining comprises verifying whether the at least one second set of parameters stored includes a second set of parameters relating to the network controlling the service, when a determination is made that the second set of parameters is needed.

15. The method according to claim 1, further comprising:
storing the first set of parameters relating to the service, wherein the first set of parameters is valid when the service is controlled by a home network.

16. The method according to claims 1, further comprising:
receiving the first set of parameters via an over-the-air interface.

17. The method according to claim 16, wherein the receiving comprises receiving the first set of parameters using at least one of cell broadcast, short message service, unstructured supplementary services data, general user datagram protocol transport service, hypertext transfer protocol, and synchronization markup language.

18. The method according to claim 16, wherein the receiving comprises receiving the first set of parameters by at least one of entering parameters during device manufacturing, entering parameters manually, entering parameters electronically, and using a pre-configured identity module.

19. The method according to claim 16, wherein the receiving comprises receiving the first set of parameters from a home network.

20. The method according to claim 19, wherein the receiving comprises receiving the first set of parameters from the home network when either of the service is subscribed or when parameters of the service change.

21. The method according to claim 1, wherein the obtaining said parameters comprises obtaining parameters relating to at least one of a service supported by a server in a session initiation protocol controlled network, a service supported by a server in an Internet multimedia subsystem, a multiparty conferencing service, and a push-to-talk over cellular service.

22. The method according to claim 1, wherein the obtaining said parameters comprises obtaining at least one of a timer parameter, a parameter for automatic login, a parameter supporting simultaneous sessions, and a parameter supporting a pre-established session.

23. The method according to claims 1, further comprising:
discarding the second set of parameters after a termination of a service session in which the second set of parameters is related.

24. A computer program embodied on a computer-readable medium, the computer program configured to control a processor to perform operations comprising:
receiving with a processor a first set of parameters relating to a service, wherein the first set of parameters is valid when the service is controlled by a first network;

determining with a processor whether a second set of parameters is needed after a session is established by comparing a network identifier of a network controlling the service with a network identifier of a user identity of a user becoming a party of the service, wherein the second set of parameters relating to said service is valid when said service is controlled by a second network; and initiating obtaining with a processor the second set of parameters, when the network identifier of the network controlling the service is different from the network identifier of the user identity of the user becoming the party of the service.

25. An apparatus, comprising:
a processor configured to receive a first set of parameters relating to a service, wherein the first set of parameters is valid when the service is controlled by a first network;
a processor configured to determine whether a second set of parameters is needed after a session is established by comparing a network identifier of a network controlling the service with a network identifier of a user identity of a user becoming a party of the service, wherein the second set of parameters relating to said service is valid when said service is controlled by a second network; and
a processor configured to initiate obtaining the second set of parameters, when the network identifier of the network controlling the service is different from the network identifier of the user identity of the user becoming the party of the service.

26. The apparatus according to claim 25, wherein the processor is configured to determine whether the service is controlled by the first network or by the second network by determining whether the service is controlled by the first network or by the second network.

27. The apparatus according to claim 26, wherein the processor is further configured to use the first set of parameters to establish a party of the service, if the service is controlled by the first network.

28. The apparatus according to claim 26, wherein the processor is further configured to use at least one of the parameters of the second set of parameters in establishing a party of the service, when the service is controlled by the second network.

29. The apparatus according to claim 25, further comprising:
a memory configured to store at least one second set of parameters.

30. The apparatus according to claim 25, wherein the transceiver is configured to receiving the first set of parameters via an over-the-air interface.

31. The apparatus according to claim 25, wherein the processor is further configured to process discard the second set of parameters after a termination of a service session in which the second set of parameters is related.

32. A method, comprising:
receiving with a receiver a request for provision of a service to a user of a client, wherein the service is controlled by a network of a communication system that uses at least one controlling network dependent parameter;
verifying whether the user of the client belongs to a network controlling provision of the service;
determining with a processor whether the client needs a set of parameters after a session is established, that relate to the service, when the user of the client belongs to a network other than the network controlling the provision of the service by comparing a network identifier of a network controlling the service with a network identifier of a user identity of a user becoming a party of the service; and providing the set of parameters, when the network identifier of the network controlling the service is different from the network identifier of the user identity of the user becoming the party of the service and determination is made that the client needs to be provided with the set of parameters.

33. The method according to claim 32, wherein the verifying comprises comparing a network identification of the network controlling the provision of the service with a network identification of the user of the client.

34. The method according to claim 32, wherein the determining comprises determining the type of the service provided.

35. The method according to claim 32, further comprising:
storing user information relating to provided service sessions.

36. The method according to claim 35, wherein the determining further comprises determining whether user information relating to the user of the client is stored.

37. The method according to claim 36, wherein the providing comprises providing the set of parameters, when it is determined the user information relating to the user of the client is not stored.

38. The method according to claim 32, wherein the providing of the set of parameters comprises negotiating the set of parameters with the client.

39. The method according to claim 32, wherein the providing of the set of parameters comprises transmitting the set of parameters to the client.

40. The method according to claim 32, wherein the receiving comprises receiving at least one of a request from the user of the client to initiate the service to other users, a request to invite the user of the client to become a party of the service and a request from the user of the client to join the service initiated by another user.

41. The method according to claim 32, wherein controlling provision of said service comprises controlling a provision of at least one of a service supported by a server in a session initiation protocol controlled network, a service supported by a server in an Internet multimedia subsystem, a multiparty conferencing service, and a push-to-talk over cellular service.

42. The method according to claim 32, wherein the providing of said parameters comprises providing at least one of a timer parameter, a parameter for automatic login, a parameter supporting simultaneous sessions, and a parameter supporting a pre-established session.

43. A computer program embodied on a computer-readable medium, the computer program configured to control a processor to perform operations comprising:
receiving with a receiver a request for provision of a service to a user of a client, wherein the service is controlled by a network of a communication system that uses at least one controlling network dependent parameter;
verifying whether the user of the client belongs to a network controlling provision of the service;
determining with a processor whether the client needs a set of parameters after a session is established by comparing a network identifier of a network controlling the service with a network identifier of a user identity of a user becoming a party of the service, that relate to the service, when the user of the client belongs to a network other than the network controlling the provision of the service; and providing the set of parameters, when the network identifier of the network controlling the service is different from the network identifier of the user identity of the user becoming the party of the service and determination is made that the client needs to be provided with the set of parameters.

44. An apparatus, comprising:
a receiver configured to receive a request for provision of a service to a user of a client, the service being controlled by a network of the communication system that uses at least one controlling network dependent parameter; and
a processor configured to
  verify that the user of the client belongs to a network controlling provision of the service,
  determine whether the client needs to be provided with a set of parameters
that relate to the service after a session is established by comparing a network identifier of a network controlling the service with a network identifier of a user identity of a user becoming a party of the service, when it is verified the user of the client belongs to a network other than the network controlling a provision of the service, and provide the set of parameters, when the network identifier of the network controlling the service is different from the network identifier of the user identity of the user becoming the party of the service and a determination is made that the client needs to be provided with the set of parameters.

45. The apparatus according to claim 44, wherein the processor is configured to verify that the user of the client belongs to a network controlling provision of the service by comparing a network identification of the network controlling the provision of the service with a network identification of the user of the client.

46. The apparatus according to claim 44, wherein the processor is configured to determine whether the client needs to be provided with a set of parameters by determining comprises determining the type of the service provided.

47. The apparatus according to claim 44, further comprising:
a memory configured to store user information relating to provided service sessions.

* * * * *